United States Patent
Hamilton

(10) Patent No.: US 7,002,818 B2
(45) Date of Patent: Feb. 21, 2006

(54) POWER CONVERTER WITH IMPROVED OUTPUT SWITCHING TIMING

(75) Inventor: Douglas L. Hamilton, Deerwood, MN (US)

(73) Assignee: Silent Power, Inc., Deerwood, MN (US)

(*) Notice: Subject to any disclaimer, the term of this patent is extended or adjusted under 35 U.S.C. 154(b) by 65 days.

(21) Appl. No.: 10/740,786

(22) Filed: Dec. 19, 2003

(65) Prior Publication Data

US 2005/0135127 A1    Jun. 23, 2005

(51) Int. Cl.
*H02M 7/217* (2006.01)
(52) U.S. Cl. .......................... 363/127; 363/89
(58) Field of Classification Search ............... 363/127, 363/89, 21.06, 21.14
See application file for complete search history.

(56) References Cited

U.S. PATENT DOCUMENTS

| | | | |
|---|---|---|---|
| 3,517,300 A | 6/1970 | McMurray | |
| 3,564,390 A | 2/1971 | Stratton | |
| 4,616,142 A | 10/1986 | Upadhyay et al. | |
| 5,371,667 A | 12/1994 | Nakao et al. | |
| 5,373,433 A | 12/1994 | Thomas | |
| 5,570,279 A | 10/1996 | Venkataramanan | |
| 6,067,243 A | 5/2000 | Suzuki et al. | |
| 6,111,769 A * | 8/2000 | Zhang et al. | 363/127 |
| 6,236,192 B1 | 5/2001 | Suzuki et al. | |
| 6,256,214 B1 * | 7/2001 | Farrington et al. | 363/127 |
| 6,288,919 B1 * | 9/2001 | Jain | 363/89 |
| 6,344,985 B1 | 2/2002 | Akerson | |
| 6,765,810 B1 * | 7/2004 | Perry | 363/21.06 |
| 6,788,554 B1 * | 9/2004 | Havanur | 363/21.06 |

* cited by examiner

*Primary Examiner*—Shawn Riley
(74) *Attorney, Agent, or Firm*—Kinney & Lange, P.A.

(57) ABSTRACT

A power converter includes an input circuit that receives DC input power and creates high frequency pulses. A transformer transforms the high frequency pulses into at least two sets of transformed pulses having alternating and opposite polarity. An output circuit connected to the transformer includes a plurality of switches for blocking undesired pulses. A controller controls the switches so that they are on except when blocking undesired pulses, so that a continuous current path is provided through the output circuit.

23 Claims, 4 Drawing Sheets

POWER CONVERTER WITH IMPROVED OUTPUT SWITCHING TIMING

Reference is made to a copending application entitled "Power Converter with Dynamic Current Limiting," filed on even date, and which is incorporated by reference.

BACKGROUND OF THE INVENTION

The present invention relates to electrical power conversion and more particularly to a system and method for converting power from one form to another.

Electrical power is typically supplied in one of two forms: direct current (DC) power and alternating current (AC) power. There are often times when it is desirable to convert from one form of power to the other form. This is accomplished by using a power converter. A power converter can convert power from AC to DC, DC to AC, AC to AC, or DC to DC. In this way, a power converter allows a device that uses one form or level of power to connect to a power source that supplies a different form or level of power.

Known power converters currently exhibit multiple problems. First, large low-frequency transformers make power converters heavy, large, and expensive. Second, power converters using high-frequency transformers are less efficient, resulting in an output power that is significantly less than the input power. Third, some power converters using high-frequency transformers can generate large voltage spikes in the output section. Fourth, in an attempt to reduce or eliminate these voltage spikes, some power converters include extra circuitry which increases their size, weight, cost, and complexity. See, for example, U.S. Pat. No. 6,067,243 versus U.S. Pat. No. 6,236,192. Fifth, a zero volt pause is another problem found with power converters using high-frequency transformers. A zero volt pause occurs when the voltage on the output pauses briefly at zero volts, such as between pulses of a pulse width modulated (PWM) output. During this brief pause, the voltage can fluctuate between a small positive and negative voltage due to noise. These voltage fluctuations can cause major problems in sensitive electronics such as furnace controllers, laser printers, and copiers.

Therefore, there is a need in the art for an efficient power converter with reduced size, weight, cost, and complexity, which does not experience large voltage spikes and exhibits a clean zero crossing.

BRIEF SUMMARY OF THE INVENTION

The present invention is a power converter and a method of converting power. The power converter includes an input circuit, a high-frequency transformer, an output circuit, and a controller. The high-frequency transformer includes a primary winding that is connected to the input circuit and secondary winding connected to the output circuit. The secondary winding produces simultaneous pulses of an opposite and alternating polarity. The output circuit includes a first switch, and a second switch. The controller includes a primary controller that synchronizes the operation of the input controller with the output controller. The output controller controls the first switch and the second switch such that each switch is on except when blocking a pulse of an unwanted polarity.

In one embodiment, DC power is received at input terminals of the input circuit from an external power source. The DC power is converted into high-frequency pulses by the input circuit. The high-frequency pulses are transformed by the high-frequency transformer into transformed pulses including desired pulses and undesired pulses. The first and second switches are maintained in an on position except when blocking undesired pulses. Finally, the desired pulses are converted into output power.

By maintaining the switches in the on position except when blocking undesired pulses, the power converter of the present invention solves the problem of voltage spikes as encountered in the prior art. Voltage spikes occur when a power converter is driving a load and all current paths are temporarily shut off between pulses such that current cannot flow. This is typical of a PWM output. By maintaining the switches in an on position except when blocking undesired pulses, one of the switches is always on. In this way, a current path is always available through the output circuit, such that voltage spikes will not build up in the output circuit.

DETAILED DESCRIPTION

Figure 1:
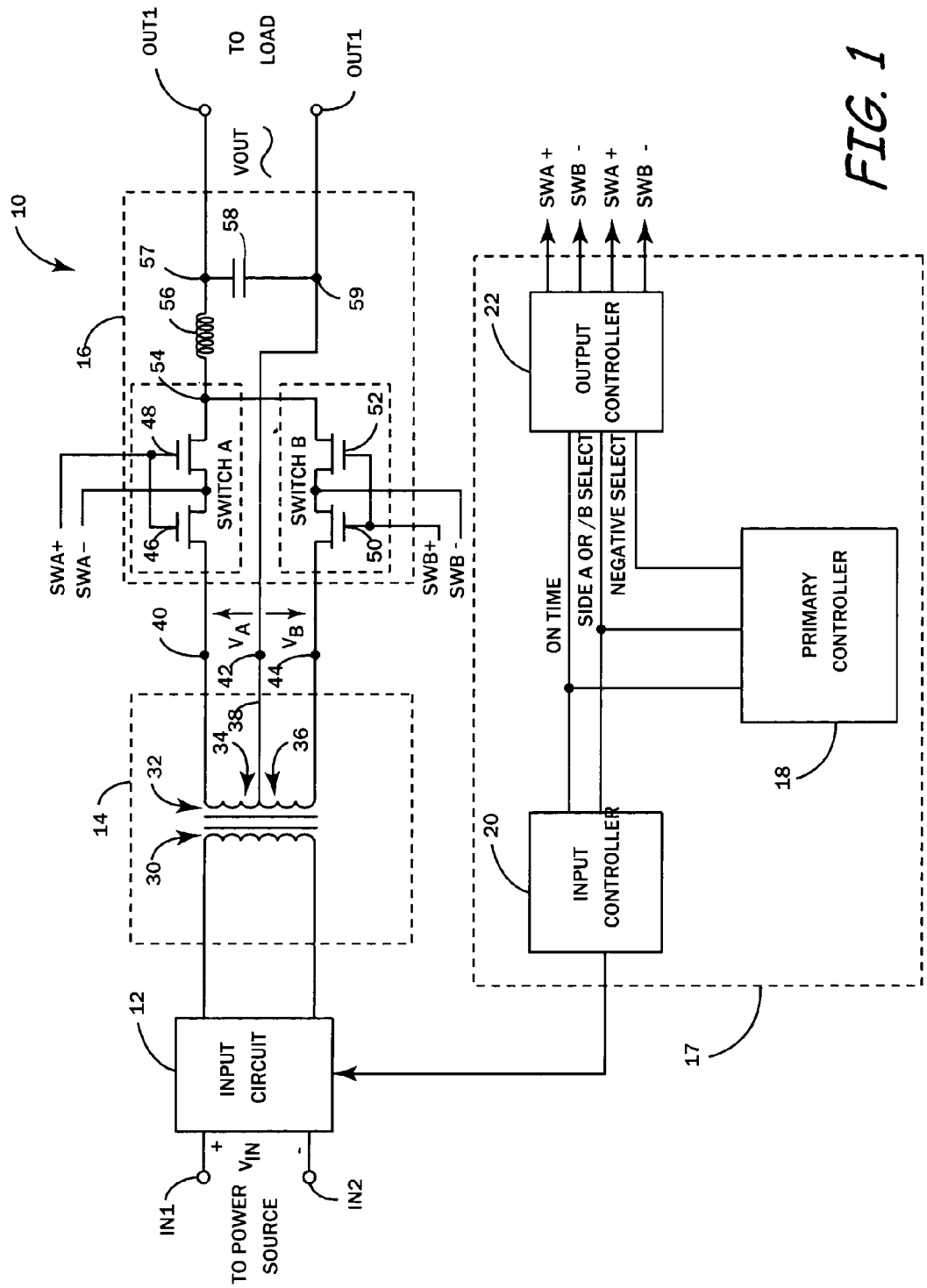
FIG. 1 is a schematic block diagram of the power converter of the present invention.

FIG. 1 is a schematic block diagram of power converter 10 of the present invention. Power converter 10 generally includes input terminals IN1 and IN2, input circuit 12, high-frequency transformer 14, output circuit 16, controller 17, and output terminals OUT1 and OUT2. Controller 17 includes primary controller 18, input controller 20, and output controller 22. In this embodiment, input DC power having a voltage $V_{IN}$ is received at input terminals IN1 and IN2 from a DC power source. Power converter 10 provides output AC power having voltage $V_{OUT}$ to an electrical load connected to output terminals OUT1 and OUT2.

Input circuit 12 can be any one of a plurality of well known input circuits such as but not limited to an H-bridge circuit or a push-pull circuit. Input circuit 12 is controlled by primary controller 18 and input controller 20 using either pulse-width modulation or pulse-phase modulation to convert DC power received at input terminals IN1 and IN2 to high-frequency pulses. Transformer 14 transforms the high-frequency pulses to the desired voltage according to a turns ratio of transformer 14. The transformed pulses are then provided to output circuit 16. Output circuit 16 is controlled by output controller 22 and converts the transformed pulses into the desired output form at output terminals OUT1 and OUT2.

Now that the general structure of power converter 10 has been described, power converter 10 will be described in more detail. Transformer 14 includes primary winding 30, secondary winding 32, and center tap 38. Secondary winding 32 includes first portion or leg 34 and second portion or leg 36. First node 40, second node 42, and third node 44 are provided between transformer 14 and output circuit 16. First portion 34 is connected between center tap 38 and first node 40. Center tap 38 is connected between first portion 34, second portion 36, and node 42. Second portion 36 is connected between center tap 38 and third node 44.

Transformer 14 is a high-frequency transformer. High-frequency transformers provide multiple benefits over low-frequency transformers. Low-frequency transformers are often very large, heavy, and expensive. On the other hand, high-frequency transformers are smaller, less expensive, and much lighter. For example, a 60 Hz, two kilowatt transformer might weigh over 25 pounds, whereas a high-frequency two kilowatt transformer can weigh as little as 2.5 pounds. By using a high-frequency transformer for transformer 14, the overall size, cost, and weight of power converter 10 is significantly reduced.

Input circuit 12 provides high-frequency pulses to primary winding 30 of transformer 14. The high-frequency pulses cause current to flow through primary winding 30. The current flow creates a magnetic field in transformer 14 which induces current to flow through secondary winding 32. The current flow through secondary winding 32 causes a voltage to be formed across the secondary winding. Using center tap 38 as a reference, the voltage at first node 40 (measured across first portion 34 from second node 42 to first node 40) is represented as $V_A$. The voltage at node 44 (measured across second portion 36 from second node 42 to third node 44) is represented as $V_B$. Each time a high-frequency pulse enters primary winding 30, either a positive or a negative voltage is created at node 40. At the same time, a voltage of equal magnitude but opposite polarity will be created at node 44, such that when $V_A$ is positive, $V_B$ will be negative. On the other hand, when $V_A$ is negative, $V_B$ will be positive. In this way, every time a high-frequency pulse is formed on primary winding 30, both a positive and a negative pulse will be supplied to output circuit 16.

In addition to this, the polarity of the pulses at $V_A$ and $V_B$ alternate such that a first pulse causing a positive $V_A$ is followed by a second pulse causing a negative $V_A$. At the same time, the first pulse causes a negative $V_B$ that is followed by the second pulse that causes a positive $V_B$.

Output circuit 16 includes switch A, switch B, fourth node 54, coil 56, fifth node 57, capacitor 58, and sixth node 59. Switch A includes first MOSFET 46 and second MOSFET 48. Switch B includes third MOSFET 50 and fourth MOSFET 52. Switch A is connected between first node 40 and fourth node 54. Switch B is connected between third node 44 and fourth node 54. Coil 56 is connected between fourth node 54 and fifth node 57. Capacitor 58 (which is optional) is connected between fifth node 57 and sixth node 59. Output terminals OUT1 and OUT2 are connected to fifth node 57 and sixth node 59, respectively.

Switches A and B are shown in this embodiment as back-to-back MOSFETs. One skilled in the art will recognize that switches A and B can be any suitable switches and are not limited to back-to-back MOSFETs. One benefit of the back-to-back MOSFET switches is their greater efficiency, resulting in little power being lost during switching. The back-to-back configuration means that the MOSFETs are connected in one of two ways: either the drains of the MOSFETS are connected together, or the sources of the MOSFETs are connected together. This configuration stops current flow in both directions through the switches when the switches are turned off.

Switches A and B are controlled by control signals from output controller 22. Control signal SWA+ is provided to the gates of first and second MOSFETs 46 and 48. Control signal SWA− is provided to the common connection between first and second MOSFETs 46 and 48. Similarly, control signal SWB+ is provided to the gates of third and fourth MOSFETs 50 and 52. Control signal SWB− is provided to the common connection between third and fourth MOSFETs 50 and 52.

Since switches A and B are operated in the same manner, the operation of switches A and B will now be described with reference to switch A. To turn on switch A, such that current can flow through it, a positive pulse is supplied by SWA+ and a relatively negative pulse is supplied by SWA−. The MOSFETs, acting like small capacitors, store the energy that is received in the gates, and force the MOSFETs into the on state. As described with reference to FIG. 4, one embodiment of the output controller maintains the gate charge by utilizing a reverse biased zener diode 76. In order to turn the switch off, a positive pulse is supplied by SWA− and a relatively negative pulse is supplied by SWA+. The negative pulse overrides zener diode 76 (FIG. 4), and pulls the charge off of the gates, forcing the MOSFETs into the off state. The timing and operation of switches A and B and output controller 22 will be described in more detail with reference to FIGS. 2–4.

After passing through switches A and B, power enters coil 56 through node 54. Coil 56 is, for example, a low-frequency continuous current coil. The current flow through coil 56 is represented by $I_C$ with positive current flow in the direction of fifth node 57. Coil 56 causes the current to continue flowing even when $V_A$ and $V_B$ are zero. Finally, the output is filtered by capacitor 58, which is a small capacitor that provides a small amount of filtering to remove any remaining ripple from the output before it enters the load.

Controller 17 provides overall control and synchronization of power converter 10. In addition, controller 17 controls switches A and B to maintain the switches on except when blocking a pulse of an unwanted polarity. This method of controlling switches A and B overcomes the problems with voltage spikes that prior power converters face. Voltage spikes occur in prior power converters when all current paths through the output circuit are turned off but current is still trying to flow. The present invention solves this problem by providing a constant path for current to flow through output circuit 16. Output controller 22 operates switches A and B of output circuit 16 such that the switches only turn off to block undesired pulses. Since the pulses are provided to switches A and B with opposite and alternating polarities, there is never a period when both switches are closed at the same time. Only one switch is ever turned off at a time, and current is always able to flow through at least one of the switches. By providing a constant path for current to flow, voltage spikes cannot build up in the output circuit. This configuration also provides for lagging currents and therefore covers the four quadrant issue that power converters are presented with when supplying inductive loads.

Primary controller 18 of controller 17 provides two control signals to input controller 20 and output controller 22: ON TIME, and SIDE A OR /B SELECT. In addition, primary controller 18 provides a third control signal, NEGATIVE SELECT, to output controller 22. The ON TIME signal is a timing signal that indicates when a pulse begins and ends. In other words, the ON TIME signal indicates the amount of time that a pulse is "on." The SIDE A OR /B SELECT signal provides a timing signal to indicate whether switch A or switch B should be turned off to block an unwanted pulse. These control signals, and the operation of controller 17, will be described in more detail with reference to FIG. 4.

Figure 2:
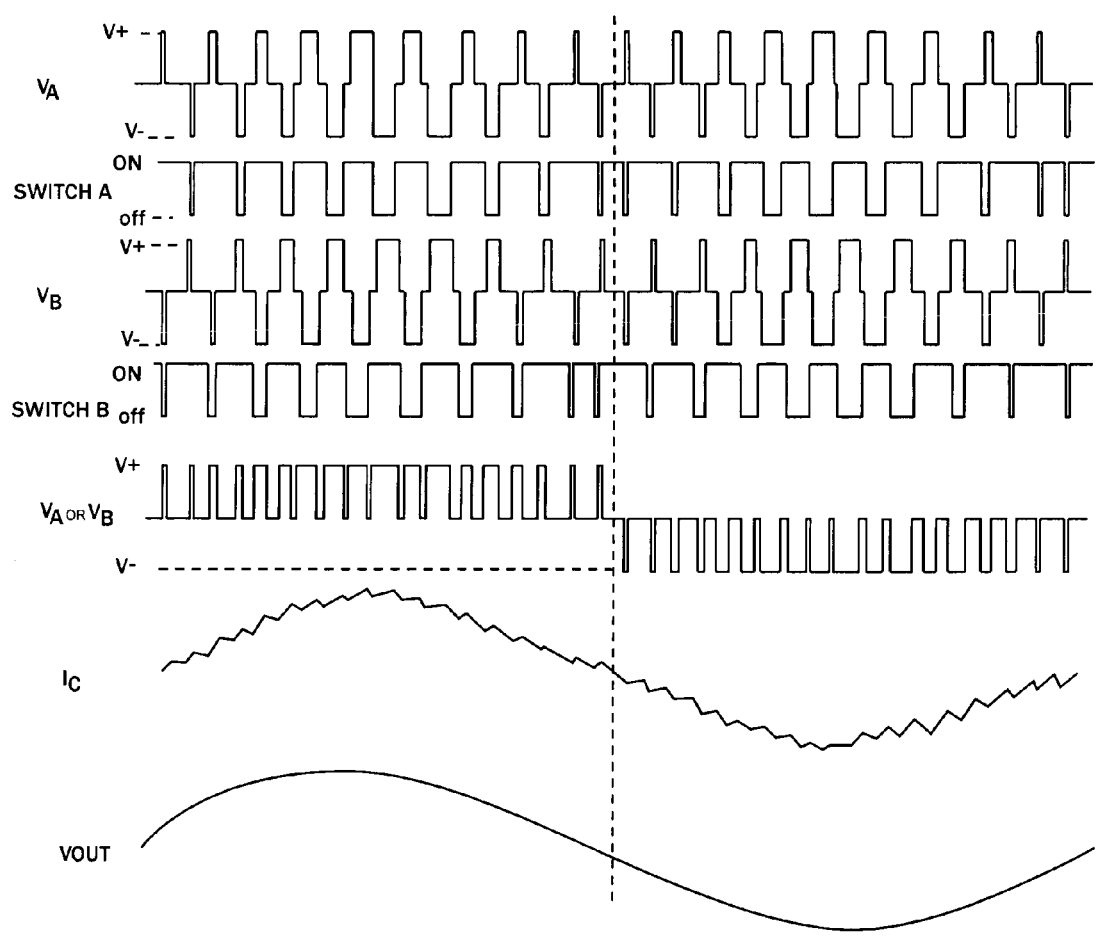
FIG. 2 is an example of a timing diagram illustrating the operation of the power converter.

FIG. 2 is a timing diagram illustrating the operation of power converter 10. The desired AC output ($V_{OUT}$) is shown. For this timing diagram it is assumed that input circuit 12 (FIG. 1) provides high-frequency pulses to transformer 14 that are pulse-width modulated. When the high-frequency pulses enter transformer 14, current is induced in secondary winding 32. This current causes $V_A$ and $V_B$ to have non-zero voltages during the received pulse. Since $V_A$ and $V_B$ are both measured relative to second node 42 (which is connected to center tap 38), the voltages at $V_A$ and $V_B$ are the inverse of each other, such that when $V_A$ is positive $V_B$ is negative, and vice versa, as shown.

Output controller 22 controls switches A and B to form the desired output by selecting whether a positive or a negative pulse is allowed to pass through switches A or B. For example, to create the first half-cycle (the positive half-cycle) of an AC output, it is desirable to operate first and second switches A and B in such a way that all negative pulses are blocked by switches A and B. This is done by allowing switch A to remain on at all times except when a negative pulse appears at switch A. At that point, switch A is turned off to block the negative pulse. After the negative pulse is over, switch A is turned back on. Similarly, switch B is controlled such that switch B remains on at all times except when a negative pulse appears at switch B. In this way, the voltage at node 54 ($V_A$ or $V_B$) consists of only positive pulses during the first half-cycle. Coil 56 then converts the pulses into continuous current in one direction for half of the AC cycle. The current through coil 56 is shown as $I_C$. Finally, capacitor 58 provides the final filtering to produce the first half-cycle of the AC output.

Once the first half-cycle of the AC output has been created, the second half-cycle (negative half-cycle) can be created. In order to produce the negative half-cycle, it is desirable to block all positive pulses with switches A and B, but let all negative pulses pass through. Switch A is controlled by output controller 22 such that switch A remains on at all times except when a positive pulse appears at switch A. At that time, switch A is turned off to block the positive pulse. After the positive pulse is over, switch A is turned back on. Similarly, switch B is controlled by output controller 22 to remain on at all times except when blocking positive pulses. In this way, the voltage at node 54 ($V_A$ or $V_B$) consists of only negative pulses during the second half-cycle. Coil 56 then converts the pulses into a continuous current in the opposite direction for the second half of the AC cycle, which is then filtered by capacitor 58.

Some prior power converters suffered from problems during the zero crossing. This occurs when the output voltage pauses at zero volts for a brief period of time, such as between PWM pulses or during the change from the AC positive half cycle to the negative half cycle (and vice versa). During this period, noise can cause minute voltage fluctuations in the output, which cause problems when driving sensitive electronic devices. The present invention solves this problem by eliminating any pause at zero volts. Rather than pausing at zero volts, the output voltage continuously builds with only a minor ripple and transitions smoothly between positive and negative voltage phases of the AC output without pausing. Note, this is all done without the aid of a free-wheeling diode (or AC switch) which adds complexity and still generates some voltage spikes.

Figure 3:
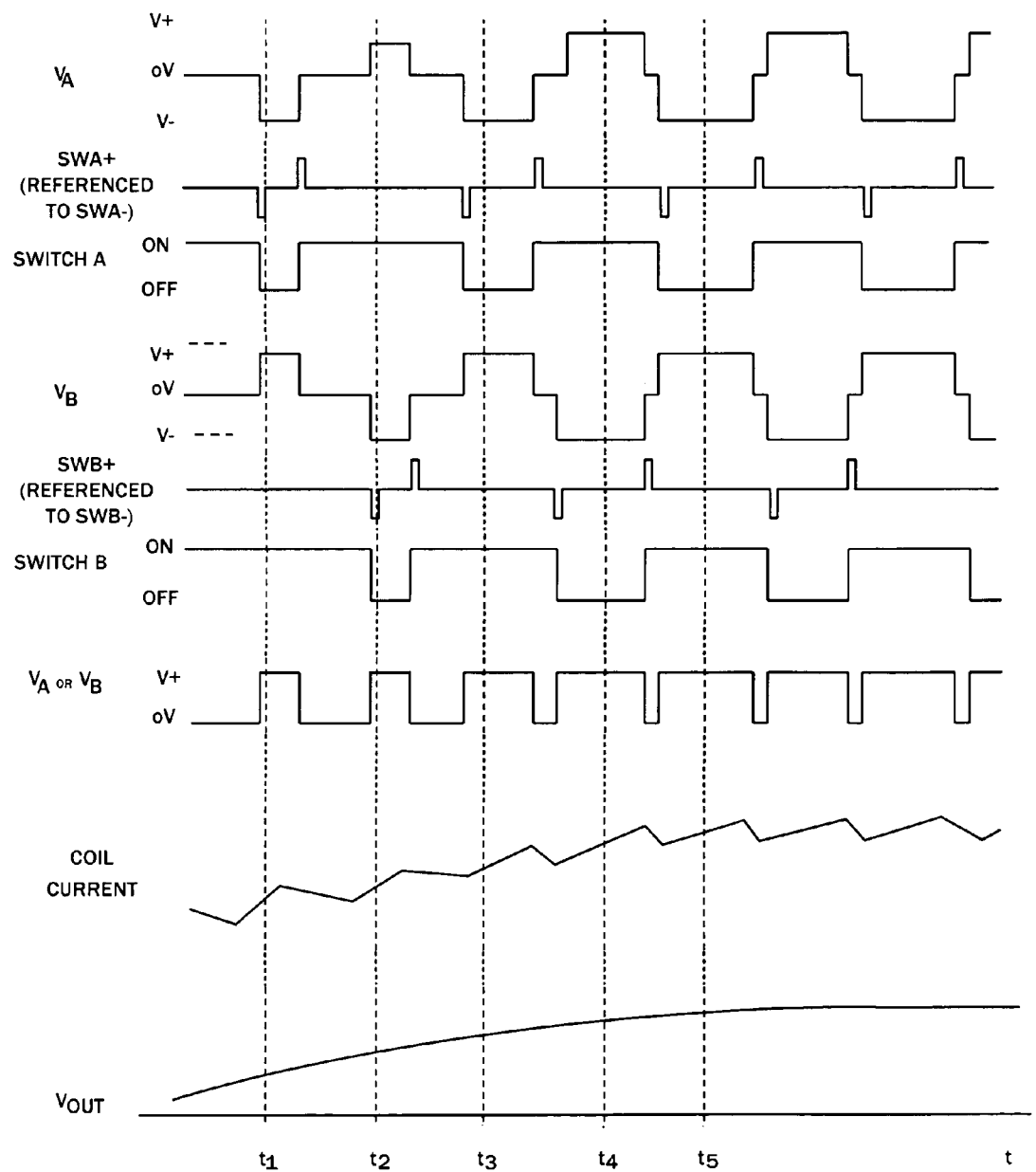
FIG. 3 is an exploded timing diagram illustrating the unique timing of the power converter.

FIG. 3 is an exploded timing diagram illustrating the unique timing of power converter 10 of the present invention. As previously described, $V_A$ and $V_B$ are the voltages at first node 40 and third node 44, respectively, measured with respect to second node 42. Switches A and B are controlled by output controller 22 to block the undesired pulses from the output. To form a positive portion of an AC output, the switches are controlled such that only positive pulses pass to the output and all negative pulses are blocked. At $t_1$, a first pulse is sent from input circuit 12, through transformer 14. As a result, $V_A$ becomes negative and $V_B$ becomes positive. In order to form the positive portion of an AC output the negative pulse must be blocked. This is done by shutting off switch A. Switch B remains on to allow the positive pulse to pass. This positive pulse causes $V_A$ or $V_B$ (at node 54) to be positive. This positive voltage is supplied to coil 56 which causes the current through coil 56 ($I_C$) to rise, resulting in a positive $V_{OUT}$ at the output.

After the first pulse has passed, both $V_A$ and $V_B$ return to 0 volts and switch A is turned back on. Now, both switch A and switch B allow coil 56 to maintain the current flow through the transformer, which decreases only slightly. Note that the decrease in current flow is exaggerated in FIGS. 3 and 4 for illustrative purposes. At $t_2$, a second pulse of opposite polarity is sent from input circuit 12, through transformer 14. As a result, $V_A$ becomes positive and $V_B$ becomes negative. In order to pass the positive pulse but block the negative pulse, switch A remains on and switch B is turned off. In this way, the positive pulse causes $V_A$ or $V_B$ to once again become positive, and this pulse is passed to coil 56. Output controller 22 continues operating switches A and B to create the desired output signal $V_{OUT}$.

Figure 4:
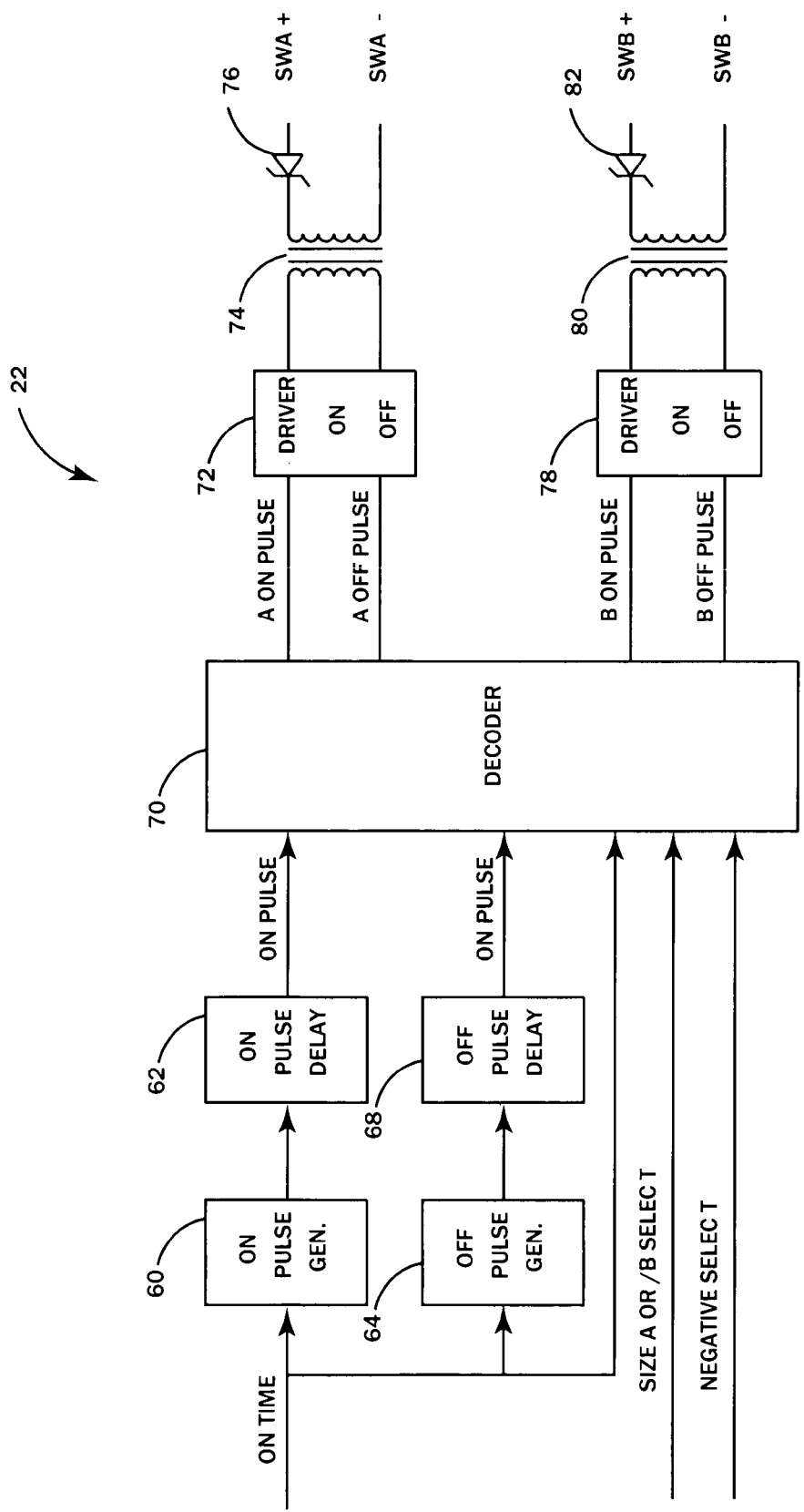
FIG. 4 is a schematic block diagram of one embodiment of an output controller.

FIG. 4 is a schematic block diagram of one example of output controller 22. Output controller 22 includes ON pulse generator 60, ON pulse delay 62, OFF pulse generator 64, OFF pulse delay 68, decoder 70, first driver 72, first pulse transformer 74, first zener diode 76, second driver 78, second pulse transformer 80, and second zener diode 82.

Output controller 22 receives three control signals from primary controller 18: ON TIME, SIDE A OR /B SELECT, and NEGATIVE SELECT. The ON TIME signal is fed into ON pulse generator 60, OFF pulse generator 64, and decoder 70. The SIDE A OR /B SELECT and NEGATIVE SELECT control signals are fed into decoder 70. The ON TIME control signal is a timing signal that indicates when pulses begin and end. In an exemplary embodiment, ON TIME is pulse width modulated to allow the formation of pulse width modulated pulses. The SIDE A OR /B SELECT control signal tells decoder 70 whether switch A or switch B should be turned off to block the pulse having the unwanted polarity. The NEGATIVE SELECT control signal tells decoder 70 to reverse the SIDE A OR /B SELECT timing in order to create the negative half-cycle of the output waveform.

The ON TIME signal is converted into an ON PULSE and an OFF PULSE by ON pulse generator 60 and OFF pulse generator 64. This is done because switches A and B require separate control signals to turn on and to turn off, as previously described with reference to FIG. 1. ON pulse generator 60 receives the ON TIME control signal and creates an ON PULSE when it detects the leading edge of the ON TIME control signal. The ON PULSE is then delayed by ON pulse delay 62 to allow for more efficient switching. OFF pulse generator 64 also receives the ON TIME control signal, but creates an OFF PULSE when it detects the trailing edge of the ON TIME control signal. The OFF PULSE is then delayed by OFF pulse delay 62.

Decoder 70 receives the ON PULSE, OFF PULSE, ON TIME, SIDE A OR /B SELECT, and NEGATIVE SELECT control signals. Using these signals, Decoder 70 determines whether to send the ON and OFF pulses to side A or side B. If, for example, the unwanted pulse is about to be present at switch A, the control signals will instruct decoder 70 to turn off switch A. Decoder 70 receives a positive signal from SIDE A OR /B SELECT which tells decoder 70 that switch A should be controlled. A "low" signal on NEGATIVE SELECT indicates that the positive half-cycle of the output is being created and so switch A is correct. Decoder 70 receives the OFF PULSE, and passes the A OFF PULSE to driver 72. Driver 72 creates a pulse in first pulse transformer 74 which creates a current through the secondary winding of first pulse transformer 74. The current provides the appropriate signals for SWA+ and SWA−, which turns off switch A. After the appropriate amount of time, decoder 70 receives the ON PULSE signal. Once again, decoder 70 checks SIDE A OR /B SELECT and NEGATIVE SELECT signal, which indicate that switch A should be controlled. Decoder 70 then provides the A ON PULSE to driver 72, which creates a pulse in pulse transformer 74. The pulse creates a current that forms the appropriate SWA+ and SWA− control signals to turn switch A back on. Zener diode 76 ensures that switch A remains in the on state until it is turned off, by maintaining the charge in the gates of switch A.

Switch B is controlled in the same way when either SIDE A OR /B SELECT is "low" and NEGATIVE SELECT is also "low," or when SIDE A OR /B SELECT is positive and NEGATIVE SELECT is also positive. In this way, switches A and B can be controlled by output controller 22 to block all unwanted pulses from the output.

Although the present invention has been described with reference to exemplary embodiments, workers skilled in the art will recognize that changes may be made in form and detail without departing from the spirit and scope of the present invention. For example, although MOSFET switches have been described as output switches A and B, other forms of switches, such as bipolar switches in parallel or solid state relays, may also be used. In addition, the invention is also applicable to output circuits including a tapless transformer output with an H-bridge.

The invention claimed is:

1. A DC to AC power converter comprising:
    an input circuit for receiving input power and creating high frequency pulses of varying width;
    a transformer for transforming the high frequency pulses into a first series and a second series of transformed pulses of alternating first and second polarity, the transformer comprising a primary winding and a secondary winding, the primary winding coupled to the input circuit;
    an output circuit including a plurality of switches for providing an AC output, the output circuit coupled to the secondary winding; and
    a controller for controlling the switches to provide a continuous current path through the output circuit, wherein the controller controls the switches such that each switch is on except when blocking a pulse of the second polarity during a first half cycle of the AC output and when blocking a pulse of the first polarity during a second half cycle of the AC output.

2. The power converter of claim 1 wherein the secondary winding of the transformer has a center tap and first and second legs.

3. The power converter of claim 2 wherein the output circuit includes a coil, a first switch coupled between the first leg and a first end of the coil, and a second switch coupled between the second leg and the first end of the coil.

4. The power converter of claim 3 wherein the output circuit includes a first output terminal coupled to a second end of the coil, and a second output terminal coupled to the center tap.

5. The power converter of claim 4 wherein the output circuit includes a capacitor coupled between the first and second output terminals.

6. A power converter comprising:
    an input circuit;
    a transformer comprising a primary winding and a secondary winding with a center tap, wherein the primary winding is coupled to the input circuit, and wherein the secondary winding comprises a first portion and a second portion, the secondary winding producing in the first portion and the second portion simultaneous pulses of opposite and alternating polarity with respect to the center tap and varying pulse width;
    an output circuit for providing an AC output comprising:
        a first AC switch coupled to receive pulses from the first portion;
        a second AC switch coupled to receive pulses from the second portion; and
        a coil coupled to the first switch and the second switch to receive pulses passed by the first and second switches and produce the AC output; and
    a controller that controls the first switch and the second switch such that each switch is on except when blocking a pulse of an unwanted polarity, so that during a first half cycle of the AC output only pulses of a first polarity are passed by the first and second switches and so that during a second half cycle of the AC output only pulses of a second polarity are passed by the first and second switches.

7. The power converter of claim 6, wherein the controller comprises:
    a primary controller;
    an input controller coupled between the primary controller and the input circuit; and
    an output controller coupled between the primary controller and the output circuit.

8. The power converter of claim 6, wherein the primary controller provides an ON TIME control signal to the input controller and to the output controller to synchronize the input controller with the output controller.

9. The power converter of claim 7, wherein the output controller operates the first switch and the second switch to provide a constant path for current flow through the output circuit.

10. The power converter of claim 7, wherein the output controller further comprises:
    an ON pulse generator;
    an ON pulse delay coupled to the ON pulse generator;
    an OFF pulse generator;
    an OFF pulse delay coupled to the OFF pulse generator;
    a decoder coupled to the ON pulse delay and the OFF pulse delay;
    a first driver coupled to the decoder;
    a first pulse transformer coupled between the first driver and the output circuit;
    a second driver coupled to the decoder; and
    a second pulse transformer coupled between the second driver and the output circuit.

11. The power converter of claim 6, wherein the output circuit further comprises a capacitor coupled to the coil.

12. A method of converting power, the method comprising:
    receiving DC power;
    converting the DC power into high-frequency pulses of varying width;

transforming the high-frequency pulses into a first series and a second series of transformed pulses, each series comprising alternating desired pulses and undesired pulses;

selectively passing desired pulses and blocking undesired pulses by maintaining a first switch and a second switch in an on condition except when blocking undesired pulses, wherein during a first half cycle the desired pulses have a first polarity and the undesired pulses have a second polarity, and during a second half cycle the desired pulses have a second polarity and the undesired pulses have a first polarity; and converting the desired pulses received from the first and second switches into an AC output.

13. The method of claim 12, wherein an output controller controls the first switch and the second switch.

14. The method of claim 12, wherein a primary controller provides an ON TIME control signal to synchronize an input controller that controls converting the first signal into high-frequency pulses with an output controller that controls the first and second switches.

15. A power converter that converts DC input power to AC output power, the power converter comprising:
an input circuit for receiving the DC input power and creating high-frequency pulses of varying width;
a transformer for transforming the high frequency pulses into a first series and a second series of transformed pulses of opposite and alternating polarity;
an output circuit for receiving the first and second series of transformed pulses, the output circuit comprising a first AC switch for controlling the passage of pulses of the first series and a second AC switch for controlling the passage of pulses of the second series; and
a controller for controlling the first AC switch and the second AC switch to create the AC output signal and to maintain at least one of the first switch and the second switch on at all times to provide a path for continuous current flow through the output circuit during operation of the power converter, the controller selectively controlling the first and second switches to pass only pulses of the first and second series having a first polarity during a first half cycle and only pulses of the first and second series having a second polarity during a second half cycle.

16. The power converter of claim 15, wherein the output circuit further comprises a low-frequency continuous current coil coupled to the first switch and the second switch.

17. The power converter of claim 15, wherein the output circuit further comprises a capacitor coupled to the coil.

18. The power converter of claim 15, wherein the first switch and the second switch each comprise back-to-back MOSFETs.

19. The power converter of claim 15, wherein the controller comprises an output controller for controlling the first switch and the second switch, the output controller comprising:
an ON pulse generator to provide an ON pulse;
an ON pulse delay to delay the ON pulse;
an OFF pulse generator to provide an OFF pulse;
an OFF pulse delay to delay the OFF pulse;
a decoder to receive the ON pulse and the OFF pulse and to select whether to adjust a state of the first switch or the second switch;

a first driver for receiving the ON pulse and the OFF pulse for the first switch;
a first pulse transformer for providing a first control signal to the first switch;
a second driver for receiving the ON pulse and the OFF pulse for the second switch; and
a second pulse transformer for providing a second control signal to the second switch.

20. A power converter comprising:
an input circuit;
a transformer comprising a primary winding and a secondary winding with a center tap, wherein the primary winding is coupled to the input circuit, and wherein the secondary winding comprises a first portion and a second portion, the secondary winding producing simultaneous pulses of opposite and alternating polarity;
an output circuit comprising:
a first switch coupled to receive pulses from the first portion;
a second switch coupled to receive pulses from the second portion; and
a coil coupled to the first switch and the second switch to receive pulses passed by the first and second switches; and
a controller that controls the first switch and the second switch such that each switch is on except when blocking a pulse of an unwanted polarity, wherein the controller comprises:
a primary controller;
an input controller coupled between the primary controller and the input circuit; and
an output controller coupled between the primary controller and the output circuit.

21. The power converter of claim 20, wherein the primary controller provides an ON TIME control signal to the input controller and to the output controller to synchronize the input controller with the output controller.

22. The power converter of claim 20, wherein the output controller operates the first switch and the second switch to provide a constant path for current flow through the output circuit.

23. The power converter of claim 20, wherein the output controller further comprises:
an ON pulse generator;
an ON pulse delay coupled to the ON pulse generator;
an OFF pulse generator;
an OFF pulse delay coupled to the OFF pulse generator;
a decoder coupled to the ON pulse delay and the OFF pulse delay;
a first driver coupled to the decoder;
a first pulse transformer coupled between the first driver and the output circuit;
a second driver coupled to the decoder; and
a second pulse transformer coupled between the second driver and the output circuit.

* * * * *